H. P. MAXIM.
AXLE FOR MOTOR VEHICLES.
APPLICATION FILED MAR. 15, 1912.
1,097,866.
Patented May 26, 1914.
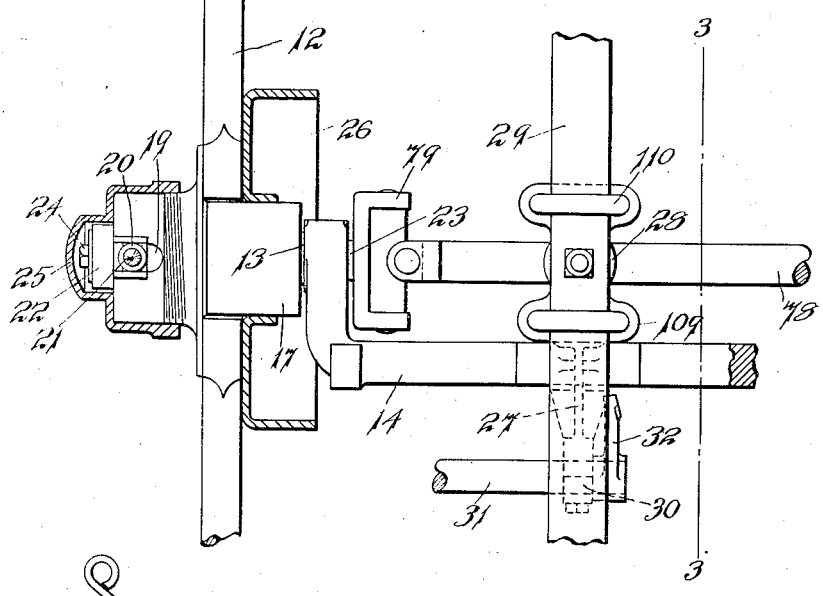
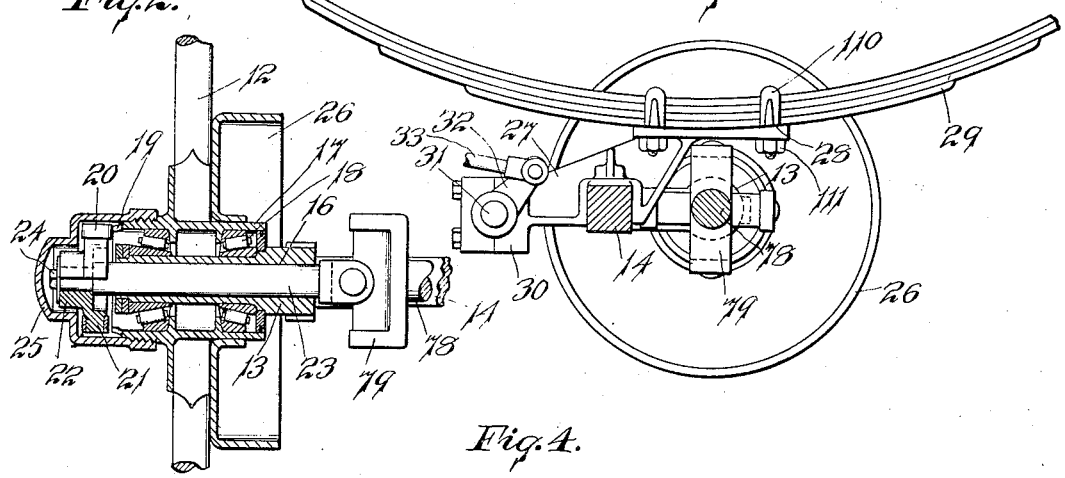
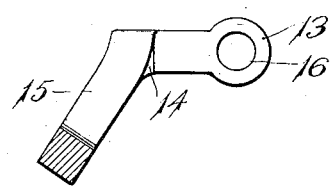
WITNESSES:
Louis Lucia
E. L. Stoughton
INVENTOR.
Hiram P. Maxim
BY
Arthur B. Jenkins
ATTORNEY.

UNITED STATES PATENT OFFICE.

HIRAM P. MAXIM, OF HARTFORD, CONNECTICUT, ASSIGNOR TO THE WAVERLEY COMPANY, OF INDIANAPOLIS, INDIANA, A CORPORATION OF INDIANA.

AXLE FOR MOTOR-VEHICLES.

1,097,866.　　　　　Specification of Letters Patent.　　Patented May 26, 1914.

Original application filed February 27, 1908, Serial No. 418,056. Divided and this application filed March 15, 1912. Serial No. 683,998.

*To all whom it may concern:*

Be it known that I, HIRAM P. MAXIM, a citizen of the United States, and a resident of Hartford, in the county of Hartford and State of Connecticut, have invented a new and Improved Construction of Axle for Motor-Vehicles, of which the following is a specification.

My invention relates to the class of devices above named, and an object of the invention, among others, is to provide a construction of axle which while being offset from the axial line of the wheels shall at the same time support the weight vertically over such axis.

One form of device embodying the invention and in the construction and use of which the object above set out, as well as others, may be attained is illustrated in the accompanying drawings, in which—

Figure 1 is a top view of a portion of the running gear of a vehicle embodying my invention, parts being cut in section to show construction. Fig. 2 is a detail view partially in section through the hub of a wheel on plane passing through the axis thereof, the wheel shown being that on the opposite end of the axle from that shown in Fig. 1. Fig. 3 is a detail view in section through the rear axle on plane denoted by dotted line 3—3 of Fig. 1. Fig. 4 is a detail view in cross-section centrally through the axle showing the two offsets.

In the accompanying drawings the numeral 12 denotes a portion of a rear or driving wheel of a vehicle, which may be of any approved form of construction. A portion only of the rear driving gear is shown herein as being necessary to a thorough understanding of the invention, the subject matter of this application being divided from that of my co-pending application, filed February 27, 1908, of Serial No. 418056. I purpose to locate the vehicle body as low as possible without interfering with the travel of the vehicle and to this end I have so constructed the rear axle that the desired result may be attained together with the advantages extending to such construction, the parts however being so arranged as to preserve other desirable features. In attaining this end an axle 13 is mounted in the wheels, extending from one to the other, and has a portion 14 offset in a horizontal plane and preferably toward the front of the vehicle, the offset portion at each end being quite close to the driving wheels, as plainly shown in Fig. 1 of the drawings. The offset portion is further offset downwardly and toward the front, as shown at 15 in Fig. 4 of the drawings, these offsets being for the purpose of allowing certain parts of the mechanism to be properly placed upon the frame and also to be properly connected up, and the arrangement is also such as to readily accommodate the mechanism described in my application above set out. The axle, as to those parts located within the supporting wheels, is hollow, as at 16, and upon which part the hubs 17 of the wheels 12 are mounted. For convenience in construction a single hub only will now be described, it being understood that the construction of each of the hubs may be the same.

Roller bearings 18 are located between the inner surface of the hub and the tubular axle arm 16, these bearings being of any approved type of construction. The hub 17, at its outer end, has slots 19 preferably located on diametrically opposite sides of the hub, and rollers 20 are located in these slots. These rollers are mounted upon studs 21 projecting from the sides of a roller support 22 secured at the end of the outer section 23 of the driving shaft that projects from the inner side of the wheel outward through the hub. This support may be held in position in any desired manner, as by means of a nut 24, a cap 25 secured to the hub closing the parts in the ordinary manner. A brake drum 26 is secured to the wheel, but as this drum of itself forms no part of my invention and its operation is readily understood by those skilled in the art, further description is deemed unnecessary herein.

Extending in an opposite direction from that in which the axle is offset and from the offset portion 14 and secured to said offset portion is a bracket 27. This bracket, as shown in Fig. 3, preferably has a recess within which the offset portion 14 of the axle is located. This bracket has a spring seat 28 upon which the spring 29 is mounted. The bracket is of such length that the spring is seated vertically over and in the plane of the axis of that portion of the axle located within the driving wheel. Projecting in the opposite direction the bracket has a bearing 30 for a brake shaft 31, to which a brake arm 32 is connected, a connecting rod 33 extending to brake operating mechanism of any approved form of construction. The opposite end of the shaft 31 is suitably connected with the brake mechanism appurtenant to the drum 26 which, for reasons above stated, is not more fully described herein. It will, of course, be understood that the mechanism just described is duplicated at the opposite end of the axle.

It will be understood that I do not limit my invention to its embodiment in a mechanism constructed in exact accordance with that shown herein and described as the invention may reside in other forms of mechanism.

The outer sections 23 of the driving shaft are connected as by means of universal joints 79 with the inner sections 78 of the driving shaft.

The spring seat 28 is provided with slots 109 through which the ends of U shaped clips 110 project and upon the ends of which nuts 111 are threaded for the purpose of holding the springs in place. This affords a means of adjustment to enable the springs to be seated in proper position.

I claim—

1. An axle for a vehicle including an arm to be located within a wheel hub, a portion offset in a horizontal direction from said arm, supporting means extending from said offset portion to a point to support a load in a plane passing vertically through the axis of the axle arm, and driving means extending through the axle arm.

2. An axle for a vehicle including an arm to be located within a wheel hub, a portion offset in a horizontal direction from said arm, a bracket extending from said offset portion and having means for supporting a load in a plane passing vertically through the axis of the axle arm, and driving means extending through the axle arm.

3. An axle for a vehicle including an arm to be located within a wheel hub, a portion offset in a horizontal direction from said arm, a bracket extending from said offset portion and having a spring seat located in a plane passing vertically through the axis of the axle arm, and driving means extending through the axle arm.

4. An axle for a vehicle including an arm to be located within a wheel hub, a portion offset in a horizontal direction from said arm, a portion offset from said offset portion, supporting means extending from said horizontally offset portion and mounted to support a load in a plane passing vertically through the axis of said arm, and driving means extending through the axle arm.

5. A supporting wheel, an axle having an arm to be located in the wheel and a portion offset in a horizontal direction, a bracket extending from said offset portion and provided with means for supporting a vehicle body in a plane passing vertically through the axis of the axle arm, and driving means extending through the axle arm.

6. A supporting wheel, an axle having an arm to be located in said wheel and a portion offset in a horizontal direction, a bracket extending from said offset portion and having a spring seat located in a plane passing vertically through the axis of said arm, a spring secured to the spring seat and arranged to support a vehicle body thereon, and driving means extending through the axle arm.

7. A supporting wheel, an axle having an arm to be located in the wheel hub and a portion offset in a horizontal direction, supporting means extending from the offset portion and arranged to support a vehicle body in a plane passing vertically through the axis of said arm, driving means extending through the axle arm, and driving connections secured to the driving means for the vehicle.

8. A supporting wheel, an axle having an arm to be located in the wheel hub and an offset portion offset toward the front of the vehicle body, supporting means extending backward from said offset portion and positioned to sustain the weight of said body in a plane passing vertically through the axis of the supporting arm, driving connections secured to the driving means for the vehicle, and driving means extending through the axle arm.

9. A supporting wheel, an axle having an arm to be located in the hub of said wheel and a portion offset toward the front of the vehicle and another portion offset in the same direction, a bracket secured to the offset portion and extending backward and having a spring seat located in a plane passing vertically through the axis of the axle arm, a spring mounted upon said seat in a plane passing vertically through the axis of said arm, and arranged to support a frame with a motor thereon, driving means extending through the axle arm, and a driving connection with said driving means.

10. An axle for a vehicle including an arm to be located within a wheel hub and a portion offset from said arm, a bracket located on said offset portion and extending on opposite sides thereof, one end of the bracket being arranged to support a vehicle body and the other end of the bracket being arranged to receive operating mechanism, and driving means extending through the axle arm.

11. An axle for a vehicle including an arm to be located within a wheel hub and an offset portion from said arm, a bracket extending backward from the direction of said offset and arranged to support a vehicle body, said bracket also extending from the offset in an opposite direction having a bearing, and a brake shaft mounted in the bearing of said bracket, and driving means extending through the axle arm.

12. An axle for a vehicle including an arm to be located within the hub, an integral portion off-set in a horizontal direction from said arm, supporting means extending from said off-set portion to a point to support a load in a plane passing vertically through the axle arm, driving means extending through the axle arm, and driving connections secured to the driving means, said driving means and driving connections being located in axial alinement.

HIRAM P. MAXIM.

Witnesses:
ARTHUR B. JENKINS,
EVA L. STOUGHTON.